Nov. 7, 1961 J. W. TUKEY 3,007,643

MICROWAVE DATA PROCESSING CIRCUITS

Filed Dec. 31, 1956

INVENTOR
J. W. TUKEY

BY Alan C. Rose

ATTORNEY

United States Patent Office 3,007,643

Patented Nov. 7, 1961

3,007,643

MICROWAVE DATA PROCESSING CIRCUITS

John W. Tukey, Princeton, N.J., assignor to Bell Telephone Laboratories, Incorporated, New York, N.Y., a corporation of New York Filed Dec. 31, 1956, Ser. No. 631,947
9 Claims. (Cl. 235—176)

This invention relates to high speed digital data processing apparatus and more particularly to such apparatus in which digital information is represented by microwave signals.

In serial binary computers, digits are characteristically represented by a signal occurring in specific time slots or digit periods. In a microwave computer system disclosed in W. M. Goodall application Serial No. 619,435, filed October 31, 1956, now Patent 2,914,249, issued November 24, 1959, the binary digits "1" and "0" are represented by the presence or absence of a microwave pulse in a wave guide in a given digit period.

A general object of the present invention is the improvement of microwave computers.

Another object of the present invention is to increase the reliability of high speed computers.

In accordance with the present invention, different digits are represented by microwave signals applied to a wave guide channel in different manners. Thus, for example, a wave guide channel may include two wave guides and the binary symbol "1" may be represented by a microwave pulse on one wave guide, and the symbol "0" by a pulse on the other wave guide. Other binary signals may be represented by microwave signals, possibly at a different frequency, on another wave guide channel. Logic circuit functions may then be accomplished by the use of frequency converters and microwave junctions.

The use of a microwave computer system in which all digital signals are represented by some type of microwave signal, as contrasted to the pulse or no pulse systems, has several advantages. Initially, the failure of signal transmission does not produce an erroneous digital signal. Furthermore, in view of the fact that each binary digit is represented by the presence of a microwave signal, simple checking devices which are responsive to the presence of microwave signals on a wave guide channel may be employed. This ease in preliminary checking as to the operativeness of the system is an important advantage of the present system.

It is a feature of the invention that each of a plurality of digital signal generators applies microwave signals to each of a corresponding plurality of wave guide channels in different ways to represent different digits.

It is another feature of the invention that logic circuits are coupled to a plurality of the wave guide channels to respond to respectively different digital combinations supplied to the channels by the signal generators.

In accordance with an additional feature of the invention, different microwave digital signals are applied to a plurality of converters and output circuits connected to the converters are energized upon the occurrence of predetermined sum or difference frequencies.

Other objects, advantages, and features of the invention may be readily apprehended by reference to the following detailed description and to the drawings, in which.

Figure 1:
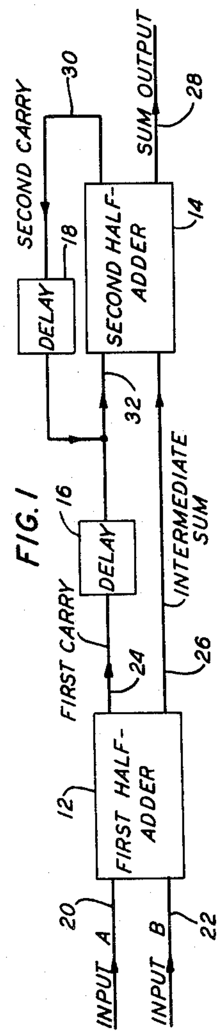
FIG. 1 is a block diagram of an addition circuit using two half-adders.

Referring to FIG. 1 of the drawings, the full adder circuit includes a first half-adder 12, a second half-adder 14, and two delay circuits 16 and 18 associated with the carry signal leads. Two serial binary input signals A and B are applied to inputs 20 and 22, respectively. These signals are processed by the first half-adder 12 to produce a first carry on channel 24 and an intermediate sum on channel 26. The second half-adder 14 may be a substantial duplicate of the first half-adder 12, and it produces a sum output on channel 28 and a second carry on channel 30. The first and second carries are delayed so they arrive at the input 32 to the second half-adder 14 simultaneously with the next successive intermediate sum digit on channel 26.

It will be helpful at this point to diverge from the direct description of FIG. 1 to consider some background material which will be useful in understanding the present specification. Two standard techniques employed in the analysis and development of computer and data processing logic circuitry involve the use of "truth tables" or definitive specifications of a desired circuit, and the techniques of Boolean algebra. These two techniques are discussed in some detail in a text entitled "Design of Switching Circuits" by W. Keister, A. E. Ritchie, and S. H. Washburn, published by D. Van Nostrand Company, Inc., New York, 1951. The principles of Boolean algebra and their application to the design of switching circuits are also discussed in an article by S. H. Washburn entitled "An Application of Boolean Algebra to the Design of Electronic Switching Circuits" which appeared at pages 380 through 388 of The Transactions of the A.I.E.E., Part I, Communications and Electronics, volume 72, September 1953.

The definitive specification, or "truth table," of a half-adder appears in Table I below:

TABLE I

| Input A | Input B | Intermediate Sum | First Carry |
|---|---|---|---|
| 0 | 0 | 0 | 0 |
| 1 | 0 | 1 | 0 |
| 0 | 1 | 1 | 0 |
| 1 | 1 | 0 | 1 |

*Definitive specification of a half-adder*

In the adding of binary numbers applied to inputs A and B, when the digit "0" is applied to both input A and input B, both the intermediate sum and the first carry outputs are also "0." When either input A or input B is "1" and the other input is "0," the intermediate sum digit is "1" and the first carry is "0." However, when both input A and input B have a signal representing a "1" applied to them, the intermediate sum digit is "0" and the first carry is "1."

The foregoing relationships can also be specified in terms of Boolean algebra. In accordance with the principles of Boolean algebra, a coincidence circuit is represented by an algebraic product, whereas a circuit which produces an output when either input is energized is represented by an algebraic sum. The last-mentioned type of circuit is often termed an "OR" circuit in logic circuit parlance. In accordance with another Boolean algebra convention, the negative of a function represented by a given symbol is represented by the symbol primed. Thus, the negative of the binary function A is the function A'. Applying the principles defined above to the definitive specification of the half-adder set forth in Table I, the following expression for the intermediate sum is developed.

$$S=A'B+AB' \quad (1)$$

Equation 1 means that the intermediate sum S is produced when input A represents the binary symbol "0" "and" when input B represents the binary symbol "1," "or" when input A is "1" "and" input B is "0."

Similarly, the Boolean algebraic expression for a carry is as follows:

$$C=AB \quad (2)$$

Equation 2 indicates, of course, that a carry is produced only when each of input A and input B represents the binary symbol "1."

In the foregoing paragraphs, background material has been presented which will be useful in understanding the remainder of the present specification. At this point, the detailed description of the drawings will be continued.

Figure 2:
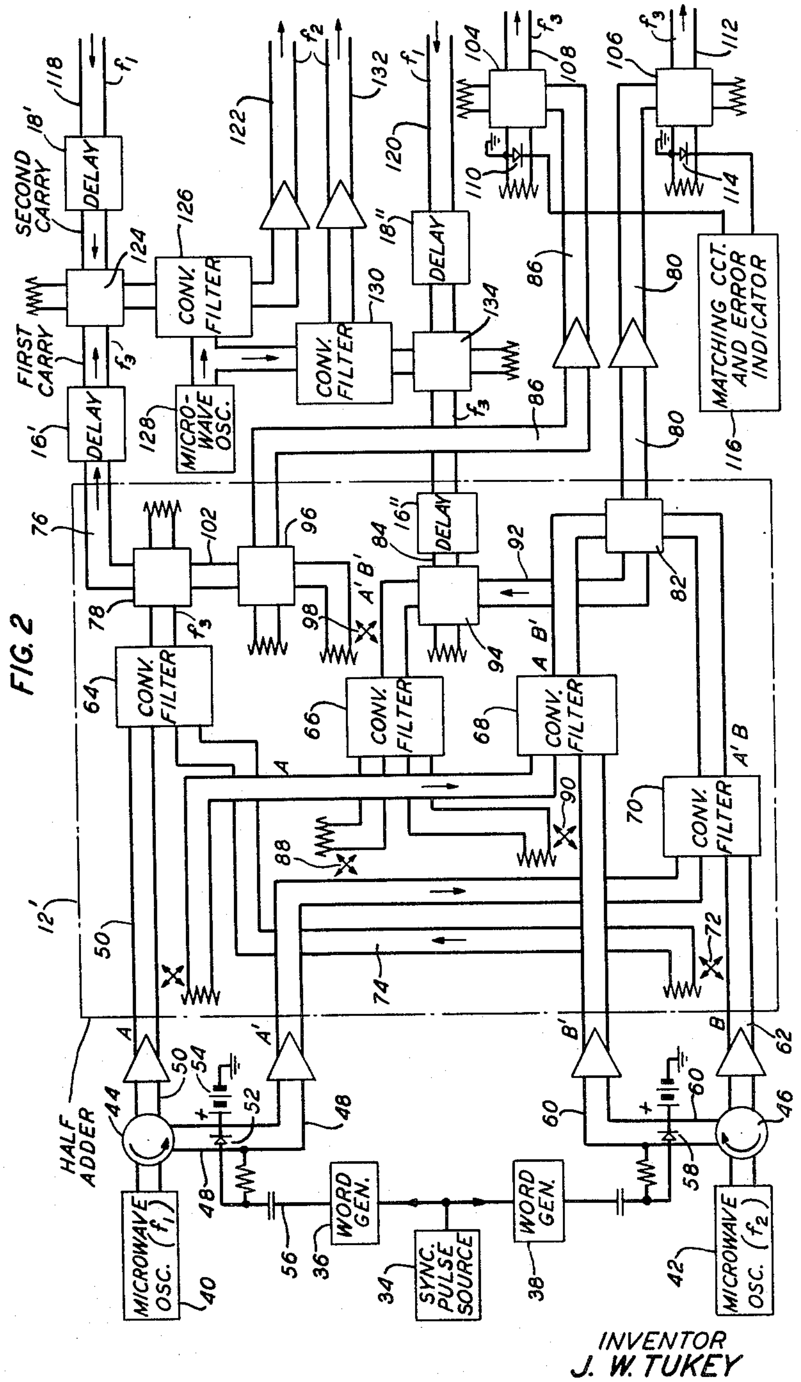
FIG. 2 is a detailed block circuit diagram of a data processing circuit in accordance with a specific embodiment of the invention.

FIG. 2 of the drawings is a detailed block circuit diagram of a portion of FIG. 1. Specifically, the dash-dot block 12' of FIG. 2 corresponds to the block 12 labelled "first half-adder" in FIG. 1. Certain frequency conversion and checking circuitry appear to the right of the half-adder block 12'. However, the pulse generation circuitry which appears to the left of block 12' will be considered first.

In serial binary computers, numbers are characteristically represented by a series of electrical signals. In general, a series of time slots are established, and a signal representing a binary "0" or a binary "1" is transmitted in each time slot. The signals representing a single number appear consecutively in a group of time slots making up a longer time interval which is normally designated a "word period."

Referring to FIG. 2, the binary signal generation circuit includes a synchronizing pulse source 34, two word generators 36 and 38, and two microwave oscillators 40 and 42. The outputs from the microwave oscillators 40 and 42 are coupled to the circulators 44 and 46. The circulator 44 has two output wave guides 48 and 50 coupled to its successive output terminals. In the absence of signals from the word generator 36, the diode 52 in wave guide 48 is normally biased in the high resistance state by the voltage source 54. Under these circumstances, microwave energy is transmitted along the wave guide 48 past the diode 52 with substantially no attenuation. When pulses are applied to the diode 52, however, its impedance is changed from the high resistance state to the low resistance state, and energy is reflected back to the circulator 44. In accordance with the well known principles of operation of circulators as described in the W. M. Goodall patent cited above, for example, energy reflected back from one output circuit of a circulator is coupled to the next successive output of the circulator. The wave guide 50 associated with circulator 44 is therefore energized when a pulse is applied to diode 52.

The word generator 36 may include a tapped delay line with a diode switch connected to each tap of the delay line. The outputs from the diode switches may be connected in parallel and to the output lead 56 from the word generator 36. As pulses from the synchronizing pulse source 34 pass down the delay line in the word generator 36, output pulses appear on lead 56 in accordance with the state of the diode switches at each tap along the delay line. The diode switches may, of course, be controlled electronically. Microwave signals from the oscillator 40 are therefore coupled either to wave guide 48 or wave guide 50, in accordance with the output pulses applied to diode 52 associated with wave guide 48. The output signals from the circulator 44 are grouped in "words" having a length corresponding to the number of taps on the delay line in the word generator 36.

The word generator 38 operates in a similar manner to produce output pulses which are applied to diode 58 associated with output wave guide 60 from the circulator 46. With the two word generators 36 and 38 both being controlled by pulses from the synchronizing pulse source 34, the microwave signals from the oscillator 42 are applied to wave guides 60 and 62 at the output of the circulator 46 in synchronism with the pulses on wave guides 48 and 50. The binary numbers represented by the pattern on the channel including wave guides 60 and 62 depend, of course, on the state of the switches in the word generator 38, and will normally be different from the binary numbers represented by the pulse pattern on the wave guide channel including wave guides 48 and 50.

In the microwave data processing circuits disclosed in FIG. 2, each binary signal is represented by a signal on one of two wave guides forming a wave guide channel. Thus, for example, input A to the half-adder 12' is represented by pulses on either wave guides 48 or 50 at a first microwave frequency $f_1$, and input B is represented by signals on one of wave guides 60 or 62 at a second microwave frequency $f_2$ In the logic circuits included in FIG. 2, the AND function is accomplished by converter-filters such as those indicated at 64, 66, 68, and 70. Choosing a simple function first, the first carry output should appear when input A and input B both represent the binary symbol "1." This logic function is accomplished by the converter-filter 64. Input A is supplied to converter-filter 64 on wave guide 50. Input B is applied to converter 64 by the directional coupler 72 and wave guide 74. In accordance with the known principles of converter operation, the signals applied to the converter 64 beat with each other and would normally produce sum and difference frequencies. However, the converter structure itself or an associated filter is tuned to pass the frequency $f_3$ which is the sum of $f_1$ and $f_2$, and to suppress the undesired difference frequency. Accordingly, when signals are applied to both wave guides 50 and 74 indicating that both inputs A and B represent the binary symbol "1," the converter 64 produces an output signal at $f_3$. This is coupled to the wave guide 76 by the hybrid junction 78. The delay units 16' and 18' in FIG. 2 correspond generally to the delay units 16 and 18 of FIG. 1. The signal applied on wave guide 76 to the delay unit 16' therefore corresponds to the first carry output of the half-adder 12.

The intermediate sum output from the half-adder 12' appears on wave guide 80 in FIG. 2. As indicated in Equation 1 above, the intermediate sum output is the Boolean algebraic function $A'B+AB'$. Accordingly, the binary signals A' and B must be combined in an AND circuit and then applied to an OR circuit in combination with another input which represents the coincidence of signals A and B'. To accomplish this function, the signals A and B' are combined in the converter 68, and the signals A' and B are combined in the converter 70. The hybrid junction 82 produces an output signal when there is an output from either converter 68 or converter 70. Accordingly, an intermediate sum output pulse on wave guide 80 is produced when either but not both of the two input signals A and B represents the binary symbol "1."

For completeness, it is also desired to provide output signals from the first half-adder 12' which are the negated first carry and the negated intermediate sum. Thus, the wave guide 84 which carries the negated first carry signal has an output pulse whenever the first carry output wave guide 76 is not energized, and the wave guide 86 carries an output signal whenever the intermediate sum output wave guide 80 is not energized.

The Boolean algebraic expression for the first carry is AB, as indicated in Equation 2. The expression for the negated first carry is (AB)'. This may also be expressed as follows:

$$(AB)'=A'B+AB'+A'B' \quad (3)$$

It may be observed that Equation 3 is the same as the expression for the intermediate sum, with the exception that it includes the additional term A'B'. Accordingly, the binary function A'B' is developed by the directional couplers 88 and 90 and the converter 66. It has been pointed out that the intermediate sum function appears on wave guide 80. It also appears on the conjugate output wave guide 92 from the hybrid junction 82. Accordingly, with the signals representing the intermediate sum function coupled to one input of the hybrid junction 94, and with the function A'B' from converter 66 being coupled to another input of hybrid junction 94, the negated carry function $A'B'+A'B+AB'$ appears at output wave guide 84. The one remaining output from the first half-adder 12' which is required is the negated intermediate sum. This is, of course, equal to the Boolean algebraic function $AB+A'B'$. The function A'B' is available at the output of converter 66, and it is coupled to hybrid junction 96 by the directional coupler 98. The other Boolean algebraic function AB is available at the output wave guide 102 from hybrid junction 78. Accordingly, the signal on wave guide 86 is the negated intermediate sum.

The system in accordance with the present invention involves the representation of binary signals on two wave guides with a microwave signal always being present on one of the two wave guides making up the channel. This arrangement lends itself readily to a simple form of preliminary checking as to the correctness of the circuit configuration, and the proper operation of at least some of the components. A typical checking circuit which might be employed is shown connected to the direct and negated intermediate sum output wave guides 80 and 86. To obtain a pulse representing the presence of microwave signals on these output wave guides, the hybrid junctions 104 and 106 are employed. Energy applied on wave guide 86 to the hybrid junction 104 divides, with half being applied to output wave guide 108 and the other half being applied to the detection diode 110. Similarly, microwave energy applied to hybrid junction 106 is coupled to output wave guide 112 and diode 114. If the data processing circuit of FIG. 2 is operating properly, pulses should be applied to the circuit 116 from one and only one of the diodes 110 and 114 during each digit period. The circuit 116 therefore includes a matching circuit to detect the simultaneous presence or absence of pulses produced by detection diodes 110 and 114 and an error indication circuit actuated when such a match occurs. The error detection circuit 116 may take any of a number of forms. If it is desired to have a direct current pulse output, a circuit may be employed such as that disclosed in J. S. Mayo application Serial No. 574,819, filed March 29, 1956, now Patent 2,946,897, issued July 26, 1960, and entitled "Direct Coupled Transistor Logic Circuits." Alternatively, if a microwave error indication signal is desired, a circuit may be employed such as that disclosed in O. E. De Lange application Serial No. 619,527, filed October 31, 1956, now Patent 2,864,953, issued December 16, 1958, and entitled "Microwave Pulse Circuits."

The signal frequencies employed at various points in the circuit of FIG. 2 will now be considered. The microwave oscillator 40 is at a first frequency $f_1$, the microwave oscillator 42 is at a second frequency $f_2$, and the output from the converters 64, 66, 68, and 70 is at a third frequency $f_3$, which is the sum of frequencies $f_1$ and $f_2$. The frequencies $f_1$, $f_2$, and $f_3$ are in the ratio of 1:2:3.

The first half-adder 12' in FIG. 2 has input signals at frequencies $f_1$ and $f_2$ and produces output signals at frequency $f_3$. The intermediate sum signal is transmitted directly to the second adder (not shown) at frequency $f_3$. The first carry and the negated first carry signals, however, are converted to frequency $f_2$ before application to the second half-adder. With input signals of $f_2$ and $f_3$ being applied to the second half-adder, the sum and second carry output signals are at frequency $f_1$. The converters in the second half-adder are therefore tuned to the difference between the applied signals rather than to their sum. The second carry signal at frequency $f_1$ is applied to the delay unit 18' on wave guide 118. The negated second carry signal, also at frequency $f_1$, is applied to the delay unit 18'' on wave guide 120.

It may be noted that the first carry signal on wave guide 76 is at frequency $f_3$, and the second carry signal on wave guide 118 is at frequency $f_1$. To convert them both to frequency $f_2$ and apply them to the carry output wave guide 122, the hybrid junction 124 and the converter 126 are employed. With the oscillator 128 supplying signals to the converter 126 at a frequency equal to $f_1$, the converter output is equal to $f_2$. This results from the ratio of microwave signals which is employed. When the ratio is 1:2:3 as mentioned above, the frequency $f_1$ of the microwave oscillator 128 subtracted from the frequency $f_3$ of the first carry produces the desired output signal from the converter 126 of frequency $f_2$. Similarly, the second carry signal at frequency $f_1$ when added to the frequency $f_1$ of the microwave oscillator 128 produces the desired output signal $f_2$ at the output of converter 126. The microwave oscillator 128 is also coupled to the converter 130 to change the negated carry signals from the first and second half-adders to the proper frequency $f_2$ on wave guide 132. If desired, individual conversion circuits may be employed in the first and second carry circuits before combination in the hybrid junction circuit 124. Similarly, individual conversion circuits may be employed to convert the negated first and second carry signals to frequency $f_2$ before combination in the hybrid junction 134.

In FIG. 1, the delay circuits 16 and 18 are provided to synchronize the arrival of carry signals at the input to the second half-adder 14 with the arrival of intermediate sum signals in the digit period following the one in which the carry signals are generated. In FIG. 2, the delay function is indicated by the delay circuits designated 16' and 18' for the first and second carry, and by the circuits designated 16'' and 18'' for the negated carry signals. Although the delay circuits are indicated as separate boxes, the proper amount of delay can be introduced by the use of wave guides of a suitable increased length, at the high pulse repetition rates which are employed in the circuit represented by FIG. 2.

The data processing circuits in accordance with the invention have been described above in terms of the adder circuit shown in FIGS. 1 and 2. A serial adder circuit was chosen to illustrate the principles of the invention partly in view of its widespread utility, and partly because of the "digital feedback" loop employed in the circuit. The carry loop from the carry output to the carry input of the adder circuit is a type of "digital feedback" loop, or short term storage circuit, which is often found in more complex data processing circuits. The applicability of the techniques of the present invention to such systems is demonstrated by the present adder circuits.

As mentioned previously, in the present circuits all digital input signals are represented by some type of microwave signal. In the particular circuits shown in FIG. 2, each digital input signal appears on a pair of wave guides forming a wave guide channel in terms of a microwave pulse on one wave guide and no pulse on the other wave guide. The microwave signals representing different digits may also be represented by different types of microwave signals, and the wave guide channel could then be a single wave guide. Data processing circuits of this last-mentioned type are disclosed in W. D. Lewis application Serial No. 631,859, entitled "Microwave Data Processing Circuits," and filed concurrently with the present application.

In the present specification and claims, a number of wave guide components have been designated by blocks or by conventional symbols. Some of these components include converters, filters, circulators, and hybrid junctions. Several of these components are disclosed in the patent of W. M. Goodall cited hereinabove. Typical microwave converters, filters, and directional couplers which may be employed are disclosed in a book entitled "Principles and Applications of Waveguide Transmission" by George C. Southworth, D. Van Nostrand Company, Inc., New York, 1950.

It is to be understood that the above-described arrangements are illustrative of the application of the principles of the invention. Numerous other arrangements may be devised by those skilled in the art without departing from the spirit and scope of the invention.

What is claimed is:

1. In a circuit for processing serial digital information supplied in successive digit periods, first and second input wave guide channels each including two wave guides, means for applying microwave signals to either one or the other of the wave guides comprising said first channel to represent respectively different binary digits in successive digit periods at a digit repetition rate of greater than twenty-five million per second, additional means for applying microwave signals to either one or the other of the wave guides comprising said second channel to represent respectively different binary digits in successive digit periods at a digit repetition rate of greater than twenty-five million per second, said microwave signal applying means including microwave signal sources of different frequencies for said first and second wave guide channels, first logic circuit means coupled to said first input wave guide channel for producing microwave output signals representing a predetermined Boolean algebraic function of the digital input signals, and second logic circuit means coupled to said second input wave guide channel for producing microwave output signals representing a different Boolean algebraic function of the digital input signals.

2. In a circuit for processing serial digital information supplied in successive digit periods, first and second input wave guide channels each including two wave guides, means for applying microwave signals to either one or the other of the wave guides comprising said first channel to represent respectively different binary digits in successive digit periods at a digit repetition rate of greater than twenty-five million per second, additional means for applying microwave signals to either one or the other of the wave guides comprising said second channel to represent respectively different binary digits in successive digit periods at a digit repetition rate of greater than twenty-five million per second, said microwave signal applying means including microwave signal sources of different frequencies for said first and second wave guide channels, first logic circuit means coupled to said first input wave guide channel for producing microwave output signals representing a predetermined Boolean algebraic function of the digital input signals, second logic circuit means coupled to said second input wave guide channel for producing microwave output signals representing the negated value of said Boolean algebraic function of the digital input signals, and a matching circuit coupled to the output of said two logic circuit means.

3. In combination in a microwave data processing circuit, first source means for providing microwave energy at one frequency, second source means for providing microwave energy at another frequency, first information transmitting means including two wave guides, second information transmitting means including two wave guides, first word generating means, second word generating means, synchronizing means connected to said first and second word generating means, means responsive to the output of said first word generating means coupled to the output of said first source means for directing microwave energy to one or the other of the wave guides of said first information transmitting means depending respectively on whether in a given digit position the output of said first word generating means is representative of a "0" or a "1," means responsive to the output of said second word generating means coupled to the output of said second source means for directing microwave energy to one or the other of the wave guides of said second information transmitting means depending respectively on whether in a given digit position the output of said second word generating means is representative of a "0" or a "1."

4. A combination as in claim 3 further including converter means coupled to said first and second information transmitting means for producing an output microwave signal only upon the occurrence of microwave signals from said two transmitting means representing a preassigned combination of binary digits, and additional converter means coupled to said first and second information transmitting means for producing an output microwave signal upon the occurrence of microwave signals from said two transmitting means representing a different combination of binary digits.

5. A combination as in claim 4 still further including microwave logic circuit means for combining the output signals from said two converter means.

6. In combination in a data processing circuit, an information channel comprising two wave guides, a microwave oscillator, base-band word generating means, means coupled to said oscillator and to said word generating means for directing the output of said oscillator to one or the other of said wave guides depending respectively on whether in a given digit position the output of said word generating means is representative of a "0" or a "1."

7. In combination in a data processing circuit, an information channel comprising two wave guides, means for applying microwave energy to said information channel to represent digital signals at a digit repetition rate greater than twenty-five million digits per second, base-band word generating means, means coupled to said microwave energy applying means and to said word generating means for directing the output of said microwave energy to one or the other of said wave guides depending respectively on whether in a given digit position the output of said word generating means is representative of a "0" or a "1."

8. In combination in a data processing circuit, a source of microwave energy, means including two wave guides for propagating said microwave energy, means for generating direct-current pulses representative of binary information, and means connected to said source and said direct-current generating means for applying the output of said source to either one or the other of said wave guides depending respectively on the state of the output of said direct-current means.

9. In a circuit for processing serial digital information supplied in successive digit periods, first and second input wave guide channels each including two wave guides, means for applying microwave signals to either one or the other of the wave guides comprising said first channel to represent respectively different binary digits in successive digit periods, additional means for applying microwave signals to either one or the other of the wave guides comprising said second channel to represent respectively different binary digits in successive digit periods, said microwave signal applying means including microwave signal sources of different frequencies for said first and second wave guide channels, a plurality of microwave converters each coupled to at least two of said wave guides, and means for combining the output signals from said converters.

References Cited in the file of this patent

UNITED STATES PATENTS

| | | |
|---|---|---|
| 2,460,075 | Dickieson | Jan. 25, 1949 |
| 2,593,113 | Cutler | Apr. 15, 1952 |
| 2,694,521 | Newman et al. | Nov. 16, 1954 |
| 2,762,949 | Huffman | Sept. 11, 1956 |
| 2,803,401 | Nelson | Aug. 20, 1957 |
| 2,851,219 | Hussey | Sept. 9, 1958 |

OTHER REFERENCES

Richards: "Arithmetic Operations in Digital Computers," 1955, page 91 relied on.